United States Patent [19]

Conklin

[11] Patent Number: 4,597,491
[45] Date of Patent: Jul. 1, 1986

[54] TRUCK LOADING APPARATUS AND METHOD

[75] Inventor: Glenn T. Conklin, Fremont, Mich.

[73] Assignee: Gerber Products Company, Fremont, Mich.

[21] Appl. No.: 597,141

[22] Filed: Apr. 5, 1984

[51] Int. Cl.⁴ .................. B65G 31/02; B65G 31/04
[52] U.S. Cl. .............................. 198/642; 198/638; 198/723
[58] Field of Search .............. 414/398, 572, 300, 301, 414/786; 198/638, 642, 698, 699, 723; 239/669

[56] References Cited

U.S. PATENT DOCUMENTS

| Re. 13,039 | 11/1909 | Felsing | 406/159 X |
|---|---|---|---|
| 2,667,386 | 1/1954 | Mathisen | 198/698 X |
| 2,812,052 | 11/1957 | Doyer | 198/638 X |
| 3,592,394 | 7/1971 | Sinden | 239/669 |
| 4,475,646 | 10/1984 | Waas | 198/480 |

*Primary Examiner*—Robert G. Sheridan
*Attorney, Agent, or Firm*—Townsend and Townsend

[57] ABSTRACT

A method and apparatus for the high volume loading of produce or other material into a bulk container such as a truck or rail car. The invention includes an endless belt driven across the opening of a hopper, and a driven rotor assembly utilizing a series of semi-flexible loops to urge the material to be loaded into engagement with the belt. The radially disposed portions of these loops provides an essentially continuous yet flexible circumferential surface for contact with the material being moved. The cooperation of these loops with the belt gives the flexibility to accommodate various sizes of material, and yet provide sufficient contact with the material to forcefully and accurately propel it from a discharge chute into the bulk container.

14 Claims, 4 Drawing Figures

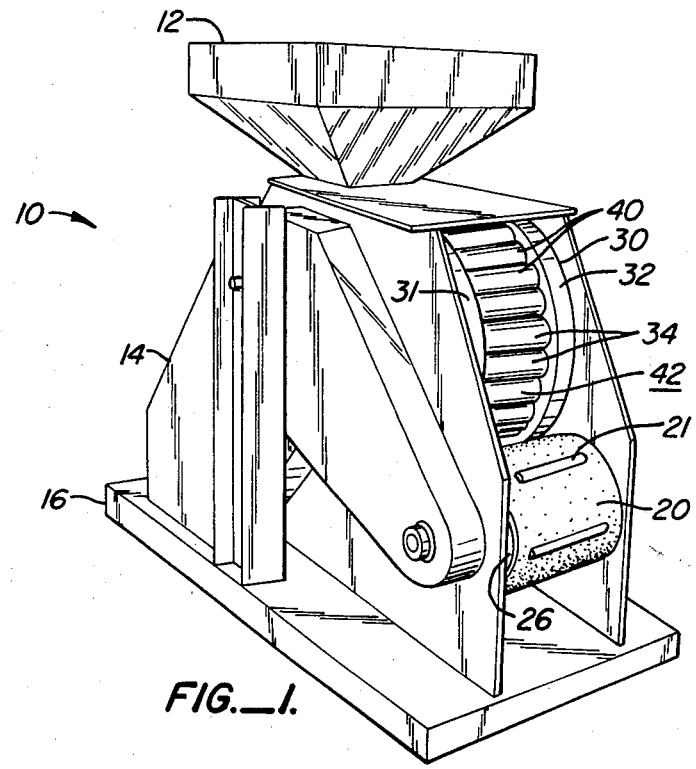
FIG._1.
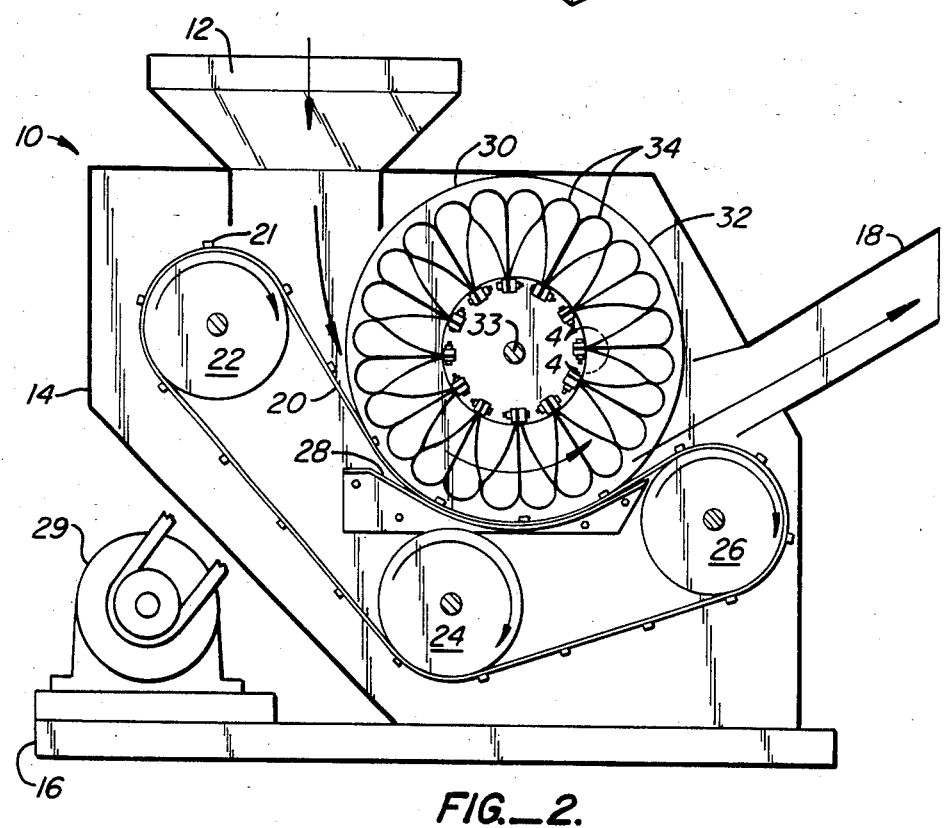
FIG._2.

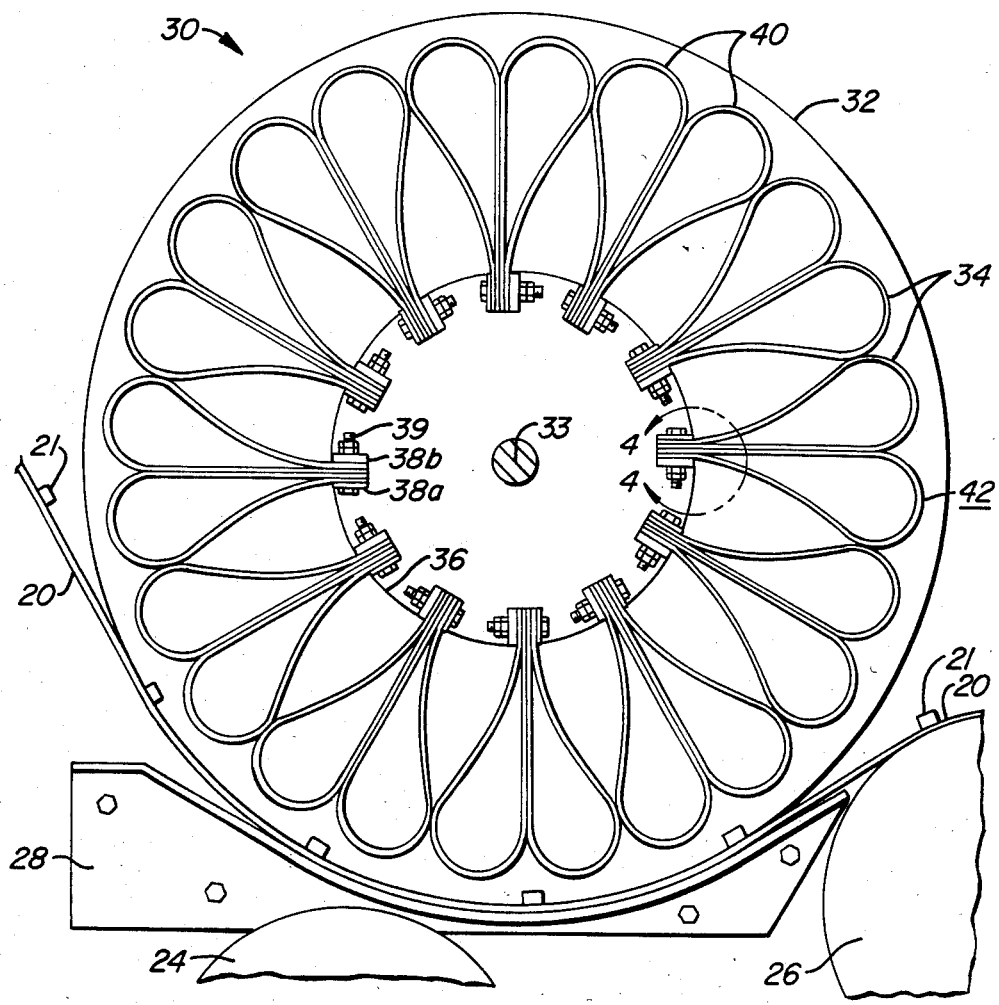
FIG._3.
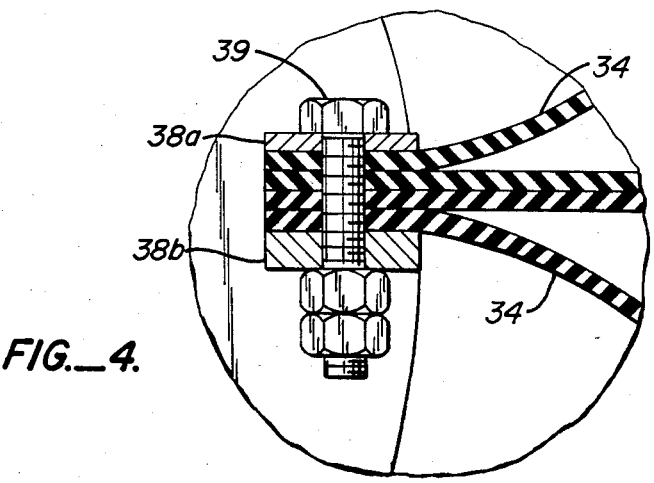
FIG._4.

TRUCK LOADING APPARATUS AND METHOD

FIELD OF THE INVENTION

This invention relates to an improved system for the high volume loading of produce or other material into a bulk container such as a truck or railcar.

BACKGROUND OF THE INVENTION

Many kinds of fruits and vegetables are bulk loaded after harvesting into trucks, trailers, rail cars and the like for shipment. Typically, fork lift equipment is used to manually dump large quantities of the produce into the bed of the trailer or rail car. Alternatively, conveyor systems are used to carry the produce along a moving belt to be deposited into the container. These methods can be slow, cumbersome and inefficient, and because of the clearances required, are often incapable of completely filling the bulk container with the produce.

Several types of centrifugal belt bulk material loading machines have been developed. For example, Sinden, U.S. Pat. No. 3,592,393 discloses a centrifugal belt thrower with a driven belt and a driven impeller. The impeller has pivoted vanes which can retract from the belt when they encounter material. However, such a system is not always suitable for use with produce, and is prone to jamming, breakage and wearing out.

SUMMARY OF THE INVENTION

What is provided as invention is an improved method and apparatus for the high volume loading of produce or other material into a bulk container such as a truck or railcar. The invention includes an endless belt driven across the opening of a hopper, and a driven rotor assembly utilizing a series of semi-flexible loops to urge the material to be loaded into engagement with the belt. The cooperation of these loops with the belt gives the flexibility to accommodate various sizes of material, and yet provide sufficient contact with the material to forcefully and accurately propel it from a discharge chute into the bulk container. Because of these attributes, the system is especially well suited to the high volume loading of frozen fruit or vegetables into refrigerated trailers or rail cars.

BRIEF DESCRIPTION OF THE DRAWINGS

FIG. 1 is a perspective view of the truck loading apparatus of this invention as it would appear with the discharge chute removed, exposing a portion of the rotor assembly with its semi-flexible loops, and the belt;

FIG. 2 is a cross-sectional view of the truck loading apparatus, showing the arrangement of the internal components and the travel path of the material to be loaded as it passes through the hopper, belt, rotor assembly and discharge chute;

FIG. 3 is an enlarged cross-sectional view of the cleated belt and rotor assembly, showing the semi-flexible loop arrangement in greater detail; and FIG. 4 is an enlarged cross-sectional view of area 4—4 of FIG. 3, showing a method of securing the semi-flexible loops to the rotor assembly in greater detail.

DETAILED DESCRIPTION OF A PREFERRED EMBODIMENT

FIG. 1 is a perspective view of a truck loading apparatus 10. Apparatus 10 includes a gravity hopper or inlet 12 overlying an apparatus housing 14 and a base 16. In the view of FIG. 1, the discharge chute or outlet has been removed to expose some of the internal components of the apparatus. Specifically, a portion of a cleated belt 20 with cleats 21 as carried by a drive drum 26 is shown in its cooperative arrangement with a rotor assembly 30 including rotor wheels 31, 32 and semi-flexible loops 34. The outer ends 40 of loops 34 define a flexible circumferential surface 42.

The apparatus 10 can of course be constructed to any size, but in the preferred embodiment, the unit is approximately 5 feet tall and 3 feet wide by 5 feet long at the base, and is designed to be easily moved about from location to location. This feature of portability enables the device to be used in the loading of trucks, trailers, railroad cars or any other bulk container. Alternatively, the apparatus could be used for the transfer of material entirely within a plant or warehouse.

The operation of the system will be best understood by reference to FIG. 2. This cross-sectional view illustrates the cooperative arrangement of the component parts of the truck loading apparatus 10, and the travel path of the material to be loaded by the apparatus.

In typical use, apparatus 10 is placed next to the bulk container to be filled, and the produce or other material is deposited by a forklift, conveyor or other source into hopper 12. The material falls through hopper 12 onto cleated belt 20, which is moving in the direction indicated by the arrows. Belt 20 with its cleats 21 is carried and driven by the arrangement of drive drum 26, idler drum 24 and take-up drum 22. A variable speed motor 29 powers drive drum 26 via a standard belt or gearing arrangement (not shown). A belt back-up plate 28 prevents belt deflection when the system is operating.

The material is carried by belt 20 into contact with the semi-flexible loops 34 of rotor assembly 30. This assembly is driven by the frictional contact of rotor wheels 31 and 32 with belt 20, and rotates about rotor assembly axis 33 in the direction illustrated by the arrows. Loops 34 act to urge the material being loaded into contact with belt 20, and jointly the loops and belt carry the material and propel it out of discharge chute 18. Chute 18 can be adjustably oriented to preferentially direct the discharge of material to efficiently and completely fill the bulk container.

In practice, variable speed motor 29 is designed to drive belt 20 at speeds of 500 to 2500 feet per minute. Such a drive rate is capable of propelling or "flinging" produce distances up to 55 feet, at transport volumes up to 50 tons per hour. With rates and volumes of this magnitude, the presence of belt back-up plate 28 becomes crucial. Without such a belt back-up, the belt would be deflected by the load to the point that, when the produce being loaded reached the discharge end drum, it would be projected along a path parallel to the plane of coincident tangency between the produce and drum, imparting a nearly vertical projectory to the produce.

FIG. 3 is an enlarged cross-sectional view of the cleated belt and rotor assembly. Cleated belt 20 is typically constructed on the order of 12" wide, and is formed of a PVC covered fabric, such as that manufactured by Leder Corporation under their designation E120/2 0+05 PVC White. While no cleats are absolutely necessary for operation of the system, it has been discovered that small (approximately ¼" high × ⅜" deep × 8" wide) spaced cleats 21 on the outer surface of the belt assist in maintaining proper alignment of the system.

Rotor assembly 30 comprises a rotor cage 36 connected between large rotor wheels 31, 32 (FIG. 1). Cage 36 includes an array of loop brackets or bars 38a, b aligned parallel to axis 33, and bracket bolts 39 which serve to secure semi-flexible loops 34 to the brackets 38a, b and rotor cage 36. Semi-flexible loops 34 are preferably made of a PVC covered fabric similar to that of the belt material, such as that manufactured by Leder Corporation under their design E 375/3 05+05 PVC Green. The loops are formed by folding pieces of material and joining the ends together at the loop brackets. In the preferred embodiment, the unfolded pieces of material are approximately 15" long and, when folded, form a loop approximately 6" long. The entire rotor assembly is positioned so that when stationary, the loops have approximately 1" of clearance from belt 20, but when rotating the centrifugal (rotational) force acts to flatten the loops, extending their lengths. Thus, as the speed of the rotor increases, the radially disposed surfaces of the loops expand towards the belt, thereby more aggressively gripping the material being conveyed. This gripping action is greatest at higher speeds when it is most needed.

The number of loops carried by the rotor assembly can, of course, vary. In the preferred embodiment, twenty-four loops, two to a bracket, are used, leaving essentially no space between the loops at their outer circumference. This results in a substantially continuous yet flexible circumferential surface 42 for contact with the material being moved, and achieves great efficiency in loading. The surface contact between loops 34 also helps to limit rotary displacement of the loops during use. That is, loops 34 are mutually supporting during use.

FIG. 4 is an enlarged cross-sectional view of loop bracket 38a, b. The bracket surrounds the ends of the two loops 34 it holds, and the entire assembly is penetrated by and secured with bracket bolt 39.

While this invention has been described in connection with preferred embodiments thereof, it is obvious that modifications and changes therein may be made by those skilled in the art to which it pertains without departing from the spirit and scope of this invention. Accordingly, the scope of this invention is to be limited only by the appended claims.

What is claimed as invention is:

1. A material throwing apparatus comprising:
   inlet means for entry of the material into the apparatus;
   means, including a belt, for conveying said material along a path within the apparatus;
   a rotor assembly means, including a plurality of radially extending semi-flexible loops positioned adjacent one another wih adjacent loops supporting one another to reduce deflection of the loops in a rotary direction, the outer ends of said loops defining a flexible, circular, rotatable circumferential surface, a portion of which circumferential surface opposes a portion of the belt, for urging said material into contact with the belt; and
   discharge means for exit of said material from the apparatus.

2. The apparatus of claim 1 wherein said loops are constructed of flexible PVC covered fabric.

3. The truck loading apparatus of claim 1 wherein said belt includes a cleated belt constructed of flexible PVC covered fabric.

4. The apparatus of claim 1 wherein said drive means includes a variable speed motor for driving both said belt and said rotor assembly means.

5. The apparatus of claim 1 wherein said inlet means comprises a gravity hopper.

6. The apparatus of claim 1 wherein the circumferential surface has a generally scalloped cross-sectional shape.

7. The apparatus of claim 6 wherein the rotor assembly means includes a plurality of radially extending semi-flexible loops positioned adjacent one another with adjacent loops supporting one another to reduce deflection of the loops in a rotary direction, the outer ends of said loops defining said circumferential surface.

8. The apparatus of claim 1 wherein said belt and said circumferential surface are driven at substantially the same speed.

9. The apparatus of claim 1 further comprising a back-up plate supporting at least part of said belt portion opposing said circumferential surface portion so to prevent deflection of the belt at the back-up plate.

10. The apparatus of claim 1 wherein the rotor assembly means is driven by the belt.

11. The throwing apparatus of claim 1 wherein said rotor assembly means includes means for rotating said assembly about an axis.

12. The throwing apparatus of claim 1 wherein the distance between the opposed belt and flexible circumferential surface portions varies according to the speed of movement of the circumferential surface.

13. A material throwing apparatus comprising:
    inlet means for entry of the material into the apparatus;
    means, including a belt, for conveying said material along a path within the apparatus;
    a rotatable rotor assembly including a plurality of radially extending, mutually supporting, semi-flexible loops defining a resilient, circular circumferential surface, a portion of said circumferential surface opposing a portion of said belt so to resiliently capture the material to be thrown therebetween;
    an arcuate back-up plate supporting at least a part of said belt portion so to prevent deflection of the belt at the back-up plate; and
    discharge means for exit of said material from the apparatus.

14. A method for loading fruit, vegetables or other material to a trailer or other bulk container comprising:
    placing said material onto a moving belt;
    urging said material into contact with said belt with a rotor assembly comprising a plurality of flexible loops mounted in a circular arrangement so that the outer ends of said loops form an essentially continuous circumferential surface for contacting the material to be moved; and
    discharging said material into the bulk container.

* * * * *